United States Patent [19]

Loeb

[11] 4,141,428
[45] Feb. 27, 1979

[54] REAR LIFT BLOCK

[76] Inventor: Thomas B. Loeb, 5257 Denny Ave., North Hollywood, Calif. 91601

[21] Appl. No.: 819,815

[22] Filed: Jul. 28, 1977

[51] Int. Cl.² .............................................. F16F 1/26
[52] U.S. Cl. .................................... 180/70 P; 267/52; 280/718
[58] Field of Search ...................... 180/70 P, 71, 73 R, 180/75; 267/52; 280/104.5 A

[56] References Cited

U.S. PATENT DOCUMENTS

| | | | |
|---|---|---|---|
| 1,550,478 | 8/1925 | Wiggins | 267/52 |
| 2,014,482 | 9/1935 | Pedranti | 267/52 |
| 2,129,656 | 9/1938 | Dougherty | 267/52 |
| 2,678,819 | 5/1954 | Douglass | 267/52 |
| 2,693,354 | 11/1954 | Walter | 267/52 X |
| 2,754,111 | 7/1956 | Norrie | 267/52 X |
| 3,730,508 | 5/1973 | Marian | 267/52 |
| 3,913,937 | 10/1975 | Longworth | 280/104.5 A |

Primary Examiner—Joseph F. Peters, Jr.
Assistant Examiner—Terrance L. Siemens

Attorney, Agent, or Firm—Gene W. Arant; Larry F. Gitlin

[57] ABSTRACT

In a driven vehicle having a drive assembly including a drive shaft, a differential, a rear universal joint coupling the drive shaft to the differential, the drive shaft being characterized by an original angle with respect to the horizontal axis of the differential, a rear axle, a rear axle housing, and rear suspension springs in connection therewith, support blocks for differentially displacing the axle and the housing from the suspension means and restoring substantially the original angle of the drive shaft relative to the differential and to the axle housing while elevating the rear body of the vehicle for maintaining increased rear vehicle road clearance and optimum effectiveness of the drive assembly operation. The support blocks, interposed between the suspension spring and the housing, have top and bottom surfaces oppositely congruent to the bottom surface of the suspension means and the upper surface of the housing, respectively.

17 Claims, 7 Drawing Figures

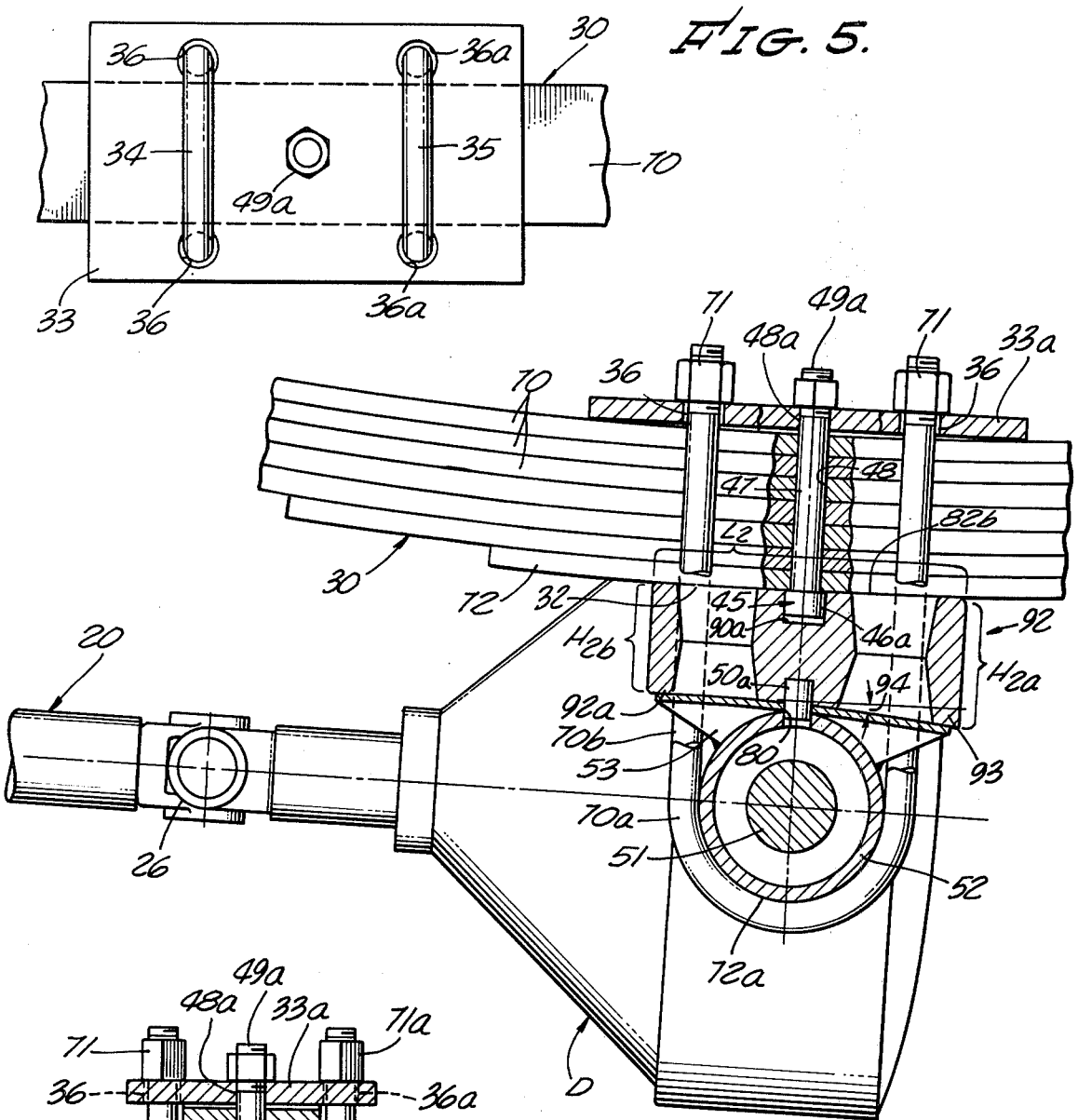
FIG. 5.
FIG. 6.
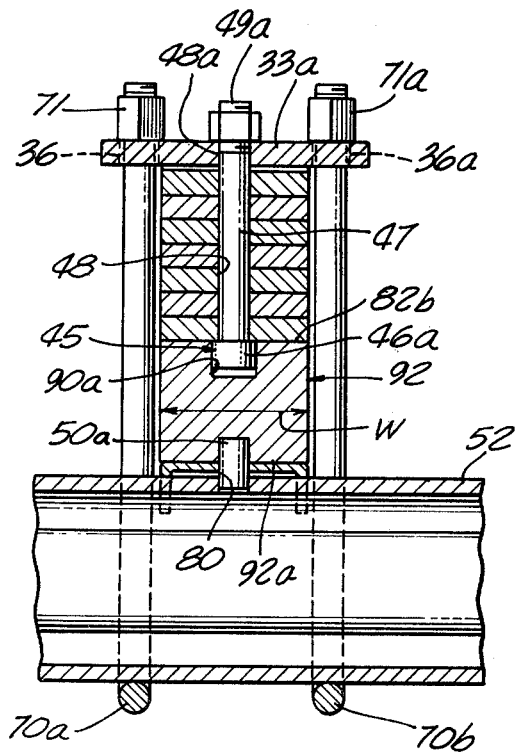
FIG. 7.

REAR LIFT BLOCK

BACKGROUND OF THE INVENTION

A conventional vehicle rear drive assembly includes a drive shaft whose front portion is connected in slip joint relation to the interiorly splined rear portion of the transmission housing and whose angular position is characterized by an original angle with respect to the horizontal axis of a differential that is associated with the rear axle of the vehicle.

Pick-up trucks, vans, jeep-type vehicles as well as certain conventional automobiles are often made to travel over extremely rough terrain indigenous to rural or remote areas when being used by their drivers for such purposes as camping, sightseeing, joy-riding or exploring.

To enable the vehicle to safely operate at maximum effectiveness without damaging the drive assembly located along the underside thereof it is often necessary to elevate the rear section of the vehicle to increase its road clearance.

By so doing, the rear fender wells gain additional road clearance permitting the increased space therewithin to accommodate oversized tires which serve to provide greater road traction and overall more efficient vehicle handling.

In the past, rear lift blocks have been used to achieve the foregoing increase in elevation of the vehicle rear section by inserting them between the suspension means and axle housing.

The resulting displacement of the axle housing from the suspension caused a rearward slippage of the slip yoke assembly at the forward end of the drive shaft which inevitably resulted in an increase in the overall length of the drive shaft, increase in the original drive shaft angle by a substantial degree, and the misalignment of the rear universal joint coupling the drive shaft to the differential.

It has been shown that the effect of such displacement by a conventional rear lift block is detrimental to the maintenance of a capable and safe vehicle drive assembly operation insofar as the misalignment of that portion of the drive assembly which includes the drive shaft-rear universal joint connection, and the slip yoke joint connection, will cause excessive wear at the sites of these respective connections and will almost surely result in their premature failure. Less significant from a safety standpoint, but yet almost equally as annoying as a mechanical failure is the loud noises emanating from a poorly aligned drive shaft-rear universal joint connection.

The present invention has been devised to resolve these problems by utilizing rear lift blocks in conjunction with the drive assembly which, when properly installed between the rear vehicle suspension and the rear axle housing, will not only increase the rear vehicle elevation, allowing for greater road clearance and the accommodation of oversized tires, but will substantially restore the original drive shaft angle and the original drive shaft-rear universal joint operating alignment for maintaining the optimum effectiveness of the entire drive assembly operation.

It is, therefore, a major object of the present invention to provide in connection with a drive assembly of a driven vehicle, a means for differentially displacing the axle housing from the suspension means and substantially restoring the original drive shaft angle and the drive shaft-rear universal joint operating alignment while elevating the rear body of the vehicle for maintaining increased rear vehicle raod clearance and optimum effectiveness of the drive assembly operation.

It is a further object of the present invention to provide a displacement means which is substantially block-shaped and interposed between the suspension means and the axle housing, the top and bottom surfaces of the displacement means being oppositely congruent to the bottom surface of the suspension means and the upper surface of the housing, respectively.

It is still a further object of the present invention to provide at least two displacement means, each of the displacement means being substantially blocked-shaped and having a concavely formed lower surface defining a shim-like extension integrally formed with one end thereof and an anchor pin intergrally formed with the lower surface and received by a bore defined by the upper surface of the housing, the shim-like extension and the anchor pin cooperatively directing the drive assembly consecutively downward and forward with an upward rotation relative to vehicle rear axle for substantial restoration of the original drive shaft angle and the original drive shaft-rear universal joint operating alignment.

DRAWING SUMMARY

The invention will be further described as to an illustrative embodiment in conjunction with the attached drawings in which:

FIG. 5 is a top perspective view of the area immediately above a single rear lift block;

FIG. 6 is an enlarged detailed cross-sectional view like FIG. 3, but showing an alternative embodiment of the present invention; and FIG. 7 is a transverse cross-sectional view of the invention as shown in FIG. 6.

DETAILED DESCRIPTION

Figure 1:
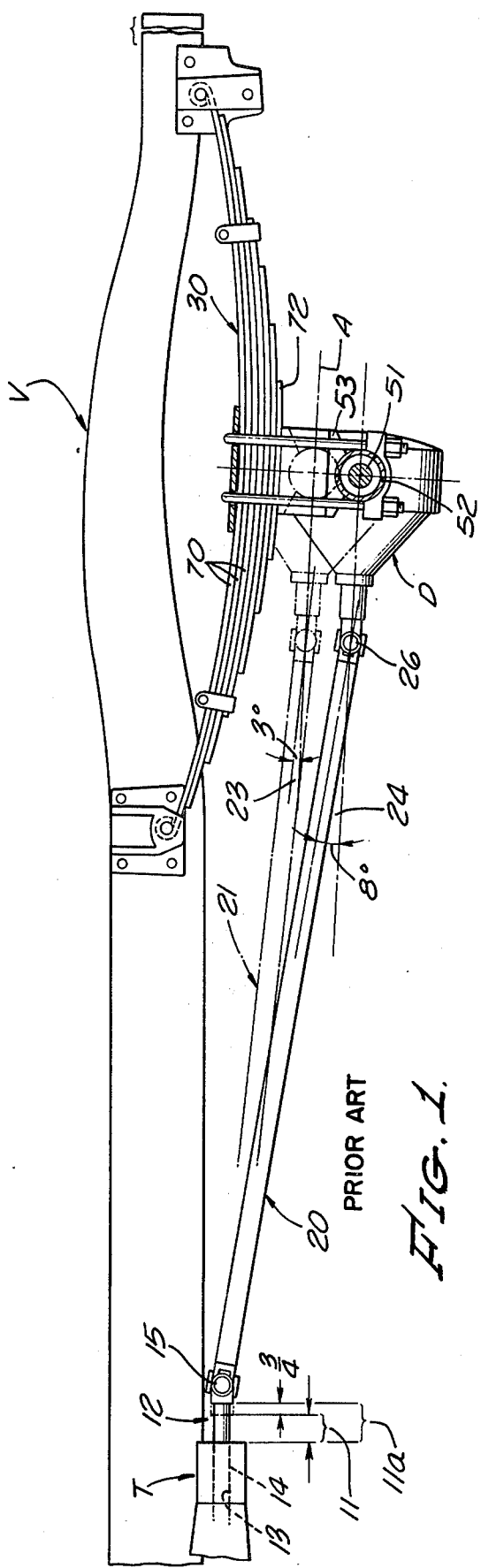
FIG. 1 is a side perspective view of a vehicle rear drive assembly showing the change in its position when a conventional rear lift block (not shown) has been inserted between the respective suspension means and the rear axle housing.
Figure 2:
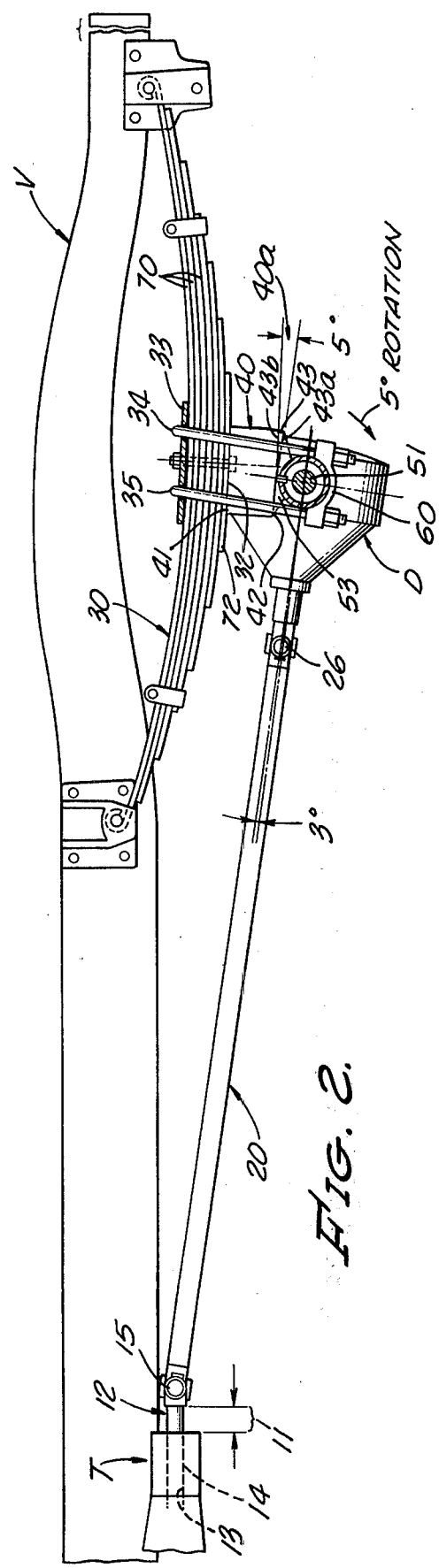
FIG. 2 is a side perspective view of a vehicle rear drive assembly in which there has been inserted between the suspension means and the rear axle housing one embodiment of the rear lift block of the present invention.

For the purpose of this disclosure reference to portions of the vehicle drive assembly are made with respect to only one side of a rear axle assembly of the rear portion of the vehicle and it is to be understood that there is a substantially symmetrical side of the axle assembly on the opposite end thereof, which is not depicted in the drawings.

As noted above, the present invention provides, in a driven vehicle having a drive assembly including a drive shaft, a differential, a rear universal joint coupling the drive shaft to the differential, the drive shaft being characterized by an original angle with respect to the horizontal axis of the differential, a rear axle, a rear axle housing, and rear suspension means in connection therewith, a rear lift block for differentially displacing the axle and the housing from the suspension means and restoring substantially the original angle of the drive shaft relative to the differential and axle housing while elevating the rear body of the vehicle for maintaining increased rear vehicle road clearance and optimum effectiveness of the drive assembly operation. The block is interposed between the suspension and the axle housing and shaped so that the upper and lower surfaces of the block are oppositely congruent with the bottom surface of the suspension and the upper surface of the housing, respectively, As a result of the present invention, it is now possible for the driver of an automobile, a pick-up truck, van, or jeep-type vehicle to elevate the rear portion of the vehicle and more safely travel upon the harsh and uneven terrain indigenous to the rural and more remote areas of the country without risking premature failure of the drive shaft-universal joint and slip yoke joint connections and normal operating effectiveness of the entire drive assembly.

Prior Art

With reference now to the drawings in detail, FIG. 1 depicts a typical drive assembly before and after a conventional rear lift block has been installed. The initial position is shown in dotted lines, and the position after installation of a conventional rear lift block is shown in solid lines.

A typical drive assembly is arranged in the following manner. The drive or propeller shaft 20 is coupled at its forward end through front universal joint 15 to a slip yoke assembly 12, the front portion of which contains internal splines 13 interlockable with external splines 14 (not shown) located within the rear section of the transmission housing T. Interlocking splines 13, 14, are free to slide to and fro in response to decreases and increases in the operating length of the drive shaft 20 determined usually by the up and down movement of the rear section of the vehicle. At the rear end of the drive shaft 20 is a rear universal joint 26 coupled the drive shaft 20 with the differential D. Rear axle 51 extends laterally beneath the rear chassis of vehicle V and through the differential D and is enclosed by axle housing 52. Above and to each side of the differential D and above each end of the axle housing 52 is the suspension, or leaf springs 30. Each individual leaf spring 30 is generally comprised of several individual elongated metal slats 70 constructed in an inversely pyramid arrangement whereby the bottom surface of the shortest slat 72 is caused to normally rest upon the saddle 53 of axle housing 52. This position is shown in dotted lines.

The length of drive shaft 20 then extends to a point so that the distance 11 between the rear of the transmission housing T and the forward section of the front universal joint 15 is relatively standard. However, once a conventional type of rear lift block has been installed in the appropriate manner the length of the drive shaft 20 increases a certain amount so that the new distance 11a between the rear of the transmission housing T and the front portion of the universal joint 15 has increased. The new position of drive shaft, differential, and axle is shown in FIG. 1 in solid lines although the lift block is not shown. Moreover, the angle 23, defined by the original drive shaft position 21 relative to the horizontal axis A of the differential D and the axle housing 52,53 will have necessarily increased to angle 24.

PREFERRED EMBODIMENT

The preferred embodiment of the present invention (FIGS. 2–5) comprises a rear lift block 40 having a length L1 of approximately six inches, the height H1a at one end of the block being approximately four inches and tapering to a height H1b of about approximately three and one-half inches at the extreme other end thereof, and a uniform width W of approximately two and three-eighths inches. An alternate embodiment (FIGS. 6,7) comprises a rear lift block 92 having a length L2 of approximately five and one-half inches, the height H2a at one end of the block being approximately two and three-thirty second inches and tapering to a height H2b of approximately one and fifteen-sixteenths inches at the extreme other end thereof, and a uniform width W of approximately two and three-eights inches. Each rear lift block is typically constructed of some metal or metal alloy, preferably cast iron, and may under certain circumstances, be constructed of materials such as wood, hardened rubber and synthetics such as plastics.

By installing rear lift block 40 or 92 of the present invention it will be possible to succeed in maintaining the elevation of the rear portion of the vehicle while simultaneously restoring the original drive shaft-rear universal joint angle 23. In so doing, no misalignment of that portion of the drive assembly which includes the drive shaft-rear universal joint connection and the slip yoke joint connection will occur therefore eliminating problems regarding excessive wear at the sites of these respective connections, particularly where interlocking splines 13, 14 are in a constant stress relationship.

Blocks 40 and 92 are interposed between the suspension means 30 and the rear axle housing 52 so that the bottom surface 42 and upper surface 41 of block 40 or bottom surface 92a and upper surface 82b of block 92 are oppositely congruent to the upper surface 53a of the axle housing saddle 53 and the bottom surface 32 of the suspension 30, respectively. The lower surface 42 of block 40 and the lower surface 92a of block 92 define shim-like extensions 43, 93 respectively, integrally formed with one side of lower surface 42, 92a respectively of blocks 40, 92. The angle 40a formed by the intersection of the bottom surface 43a of shim extension 43 and its hypothetical top surface 43b is substantially identical to the degree of increase shown by the angle 24 over that of angle 23, resulting from the installation of a conventional rear lift block. The same is true for angle 94 formed by the intersection of the respective surfaces defined by rear lift block 92.

Figure 3:
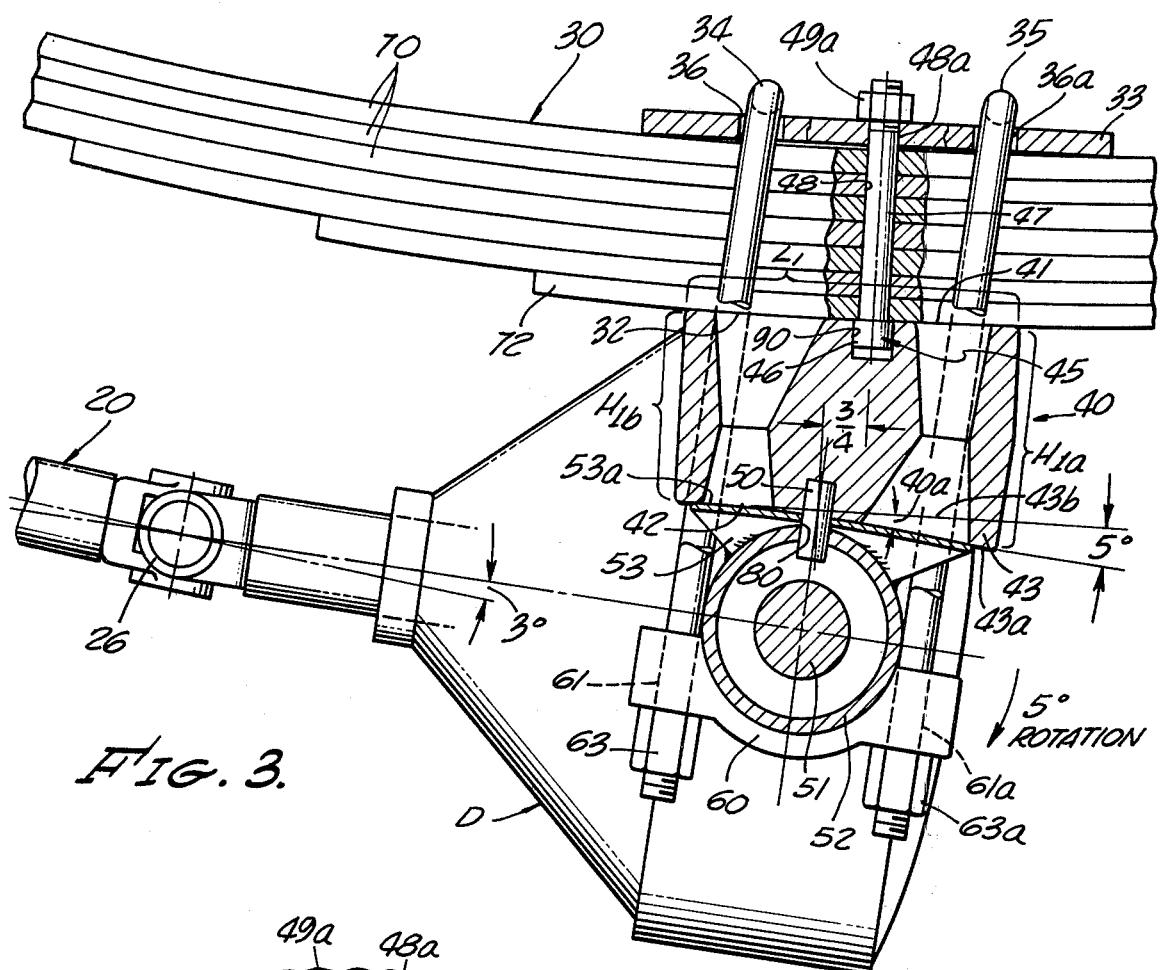
FIG. 3 is an enlarged detailed sectional view of the embodiment of FIG. 2, including the rear lift block.

With respect to the embodiment shown in FIGS. 2–5, the anchor pin 50, integrally formed with the lower surface 42 of block 40, is received by a bore 80 defined by the upper surface 53a of the axle housing saddle 53. As shown in FIG. 3, anchor pin 50 is established along a vertical axis approximately three-quarters of an inch forward of the vertical axis established by the positioning of bolt 45. The combination of the anchor pin 50 in the position as described, and the shim-like extension 43, cooperatively cause the drive assembly to be directed consecutively downward and forward in rotational fashion for restoration of the original drive shaft-rear universal joint operating angle 23.

Due to the much smaller size of block 92 as depicted in FIGS. 6 and 7, it is unecessary to align the anchor pin 50a forward of the vertically directed axis of the bolt 45.

FIG. 6 shows anchor pin 50a and bolt 45 in coincidental alignment along the same vertical axis.

Figure 4:
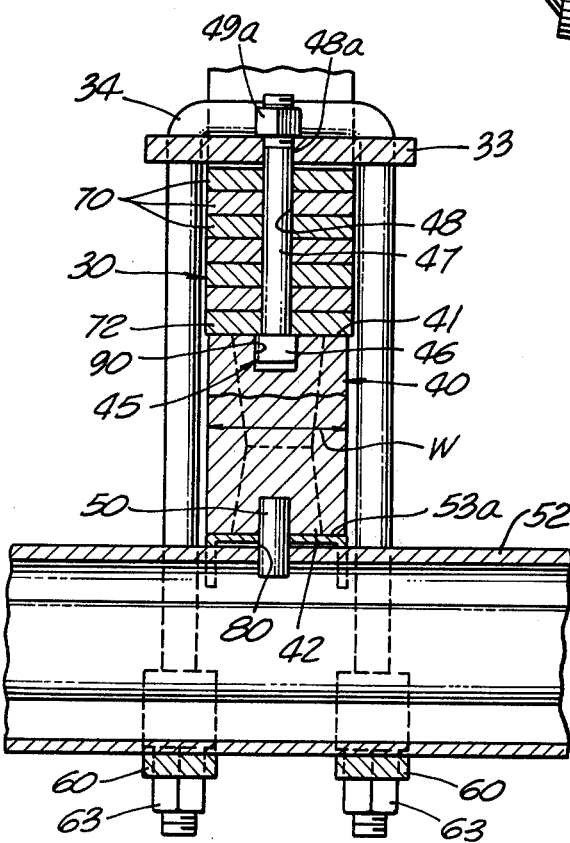
FIG. 4 is a transverse cross-section of the leaf spring and rear lift block of FIG. 2, showing the rear axle housing in longitudinal cross-section.

Only when the height of a rear lift block 40 such as that which is depicted in FIGS. 3 and 4 is of a certain dimension will it be necessary to establish a position for anchor pin 50 a certain distance forward of the vertical axis established for bolt 45. Apparently, the greater the height of a rear lift block the greater the misalignment of the drive shaft-rear universal joint operating angle and the greater the rearward slippage of the yoke assembly 12 placing increased stress on the interaction of splines 13, 14. The rearward slippage of the yoke assembly 12 and change in the original angle 23 are insignificantly realized when using the embodiment depicted in FIGS. 6 and 7, i.e., the smaller rear lift block 92.

Blocks 40 and 92 may be secured between the suspension 30 and the axle housing 52 in substantially the identical fashion. Two securement methods will be described and reference will be made to block 40 as to one method and block 92 as to an alternative method.

To secure the block 40 between the suspension 30 and the axle housing 52 a pair of terminally threaded U-shaped bolts 34, 35, are received through plate 33 defining bolt passing apertures 36, 36a, and straddle the suspension 30 extending vertically downwards along the sides of the block 40 and beneath the housing 52 to be received thereunder by a second plate 60 defining bolt passing apertures 61, 61a, whereby the bolts 34, 35 extending through the apertures 61, 61a are threadedly engaged by threaded nuts 63, 63a, in tight contact relation. A conventional type of bolt 45 is received vertically upwards through an aperture 48 defined by leaf springs 30 having a diameter smaller than the diameter of the head 46 of bolt 45. The terminally threaded end of the body 47 of bolt 45 extends through an aperture 48a defined by plate 33 and is threadedly engaged by threaded nut 49a in tight contact relation therewith. The head 46 of bolt 45 is received in anchoring relation by a bore 90 having a depth of approximately two-thirds of an inch defined by the top surface 41 of the block 40, the union thereof serving to prevent the slippage of the two contacting surfaces. Anchor pin 50 formed integrally with the bottom surface 42 of block 40 is tightly inserted into bore 80 having a depth of approximately two-thirds of an inch defined by the upper surface 53a of axle housing 53.

An alternate method of securement is by interposing rear lift block 92 of the present invention between the leaf springs 30 and axle housing 52 as follows. A pair of terminally threaded U-bolts 70a, 70b are caused to straddle the underside of the axle housing 52 and extend on either side thereof vertically upwards to be received through apertures 36, 36a in plate 33a whereupon threaded nuts 71, 71a are engaged with the terminal ends of bolts 70a, 70b in tight contact relation. A conventional bolt 45 is received vertically upwards through an aperture 48 defined by leaf springs 30 having a diameter smaller than the diameter of the head 46a of bolt 45. The terminally threaded end of the body 47 of bolt 45 extends through an aperture 48a defined by plate 33a and is threadedly engaged by threaded nut 49a in tight contact relation therewith. The unions of head 46a of bolt 45 and bore 90a and anchor pin 50 and bore 80 are achieved as previously described with reference to respective parts involved in the securement of block 40.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. In a vehicle having a frame, a rear axle, a drive shaft having its forward end adjustably supported from said frame and its rearward end operatively coupled through a differential to said axle, a housing for said axle, and a pair of rear suspension springs supporting the frame above the axle housing;
   means for supporting the springs and the rearward end of the frame at a further elevated position above the axle but without substantially diminishing the operational effectiveness of the drive shaft, comprising:
   a pair of rear lift blocks which have a larger vertical dimension at their rearward ends than at their forward ends;
   means holding said lift blocks between the upper surface of the axle housing and the under surfaces of corresponding ones of the suspension springs, thereby placing the upper surface of the axle housing in nonparallel relationship to the springs; and
   means associated with each of said blocks and interengaging both the axle housing and the corresponding one of the springs for inhibiting any forward or rearward sliding movement of the axle housing relative to the spring, including a recess formed in the upper surface of said block which receives a bolt carried by the spring, and an anchor pin extending from the lower surface of said block which engages an opening in the axle housing, said anchor pin being located nearer to the forward end of the block than is said recess;
   said blocks, holding means, and inhibiting means cooperating to support the forward end of the drive shaft in a position substantially as far forward relative to the vehicle frame as it was prior to the further elevation of the springs and the rearward end of the frame, while also maintaining substantially the original angular position of the drive shaft relative to the differential.

2. A rear lift block for raising the rear end of a vehicle above its original elevation, comprising:
   a block-like member having a length of about six inches, a width of about two and a half inches, a height of about four inches at one end, a height of about three and one-half inches at the other end, and having its vertical dimension tapered from said one larger end to said other and smaller end;
   said member having a normally top side in which a central process is formed; and
   an anchor pin permanently secured to and projecting from the bottom side of said member, said anchor pin being positioned closer to the smaller end of said member than is said recess.

3. A rear lift block as in claim 2 wherein said recess is large enough to receive said anchor pin, whereby when said lift block is installed between an axle housing and a leaf spring, a bolt projecting from the leaf spring and formerly received in a bore in the axle housing may then be received in said recess, while said anchor pin is received in said bore.

4. A rear lift block as in claim 3 wherein said anchor pin is about three-quarters of an inch closer to the smaller end of said member than is said recess.

5. A rear lift block as in claim 3 wherein said member is made of cast iron and has two vertical openings therethrough, one between said recess and anchor pin and the smaller end of said member, the other between said recess and anchor pin and the larger end of said member.

6. A rear lift block as in claim 3 wherein both the top and bottom sides of said member are curved longitudinally of said member, forming concave surfaces.

7. A rear lift block as in claim 2 wherein said anchor pin is about three-quarters of an inch closer to the smaller end of said member than is said recess.

8. A rear lift block as in claim 7 wherein said member is made of cast iron and has two vertical openings therethrough, one between said recess and anchor pin and the smaller end of said member, the other between said recess and anchor pin and the larger end of said member.

9. A rear lift block as in claim 7 wherein both the top and bottom sides of said member are curved longitudinally of said member, forming concave surfaces.

10. A rear lift block as in claim 2 wherein said member is made of cast iron and has two vertical openings therethrough, one between said recess and anchor pin and the smaller end of said member, the other between said recess and anchor pin and the larger end of said member.

11. A rear lift block as in claim 10 wherein both the top and bottom sides of said member are curved longitudinally of said member, forming concave surfaces.

12. A rear lift block as in claim 2 wherein both the top and bottom sides of said member are curved longitudinally of said member, forming concave surfaces.

13. In a vehicle having a frame, a rear axle, a drive shaft having its forward end adjustably supported from said frame and its rearward end operatively coupled through a differential to said axle, a housing for said axle, and a pair of rear suspension springs supporting the frame above the axle housing;
   means for supporting the springs and the rearward end of the frame at a further elevated position above the axle but without substantially diminishing the operational effectiveness of the drive shaft, comprising:
   a pair of rear lift blocks which have a larger vertical dimension at their rearward ends than at their forward ends;
   means holding said lift blocks between the upper surface of the axle housing and the under surfaces of corresponding ones of the suspension springs, thereby placing the upper surface of the axle housing in nonparallel relationship to the springs; and
   means associated with each of said blocks and interengaging both the axle housing and the corresponding one of the springs for inhibiting any forward or rearward sliding movement of the axle housing relative to the spring;
   said blocks, holding means, and inhibiting means cooperating to support the forward end of the drive shaft in a position substantially as far forward relative to the vehicle frame as it was prior to the further elevation of the springs and the rearward end of the frame, while also maintaining substantially the original angular position of the drive shaft relative to the differential.

14. Support means as in claim 13 wherein each of said rear lift blocks is a block-like member having a length of about six inches, a width of about two and one-half inches, a height of about four inches at one end, a height of about three and one-half inches at the other end, and having its vertical dimension tapered from said one larger end to said other and smaller end.

15. Support means as in claim 13 wherein each of said rear lift blocks is a block-like member having a length of about five and a half inches, a width of about two and a half inches, a height of about two and three thirty-seconds inches at one end, a height of about one and fifteen sixteenths inches at the other end, and having its vertical dimension tapered from said one larger end to said other and smaller end.

16. A rear lift block for raising the rear end of a vehicle above its original elevation, comprising:
   a block-like member having a length of above five and a half inches, a width of about two and a half inches, a height of about two and three thirty-seconds inches at one end, a height of about one and fifteen sixteenths inches at the other end, and having its vertical dimension tapered from said one larger end to said other and smaller end;
   said member having a normally top side in which a central recess is formed; and
   an anchor pin permanently secured to and projecting from the bottom side of said member, said anchor pin being positioned directly beneath said recess.

17. A rear lift block as in claim 16 wherein said member is made of cast iron and has two vertical openings therethrough, one between said recess and anchor pin and the smaller end of said member, the other between said recess and anchor pin and the larger end of said member.

* * * * *